Nov. 14, 1961     S. K. HODGSON     3,008,554
NUT AND RETAINER FOR WORKPIECES WITH NON-PARALLEL FACES
Filed Feb. 13, 1958
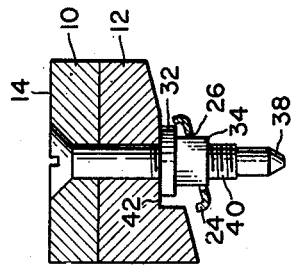
Fig. 4
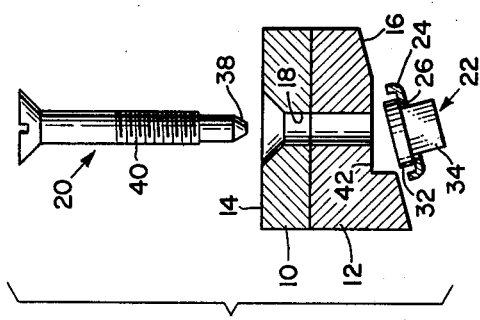
Fig. 3
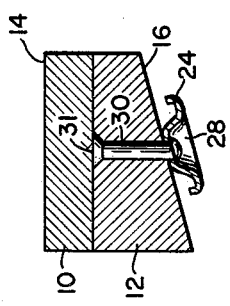
Fig. 2
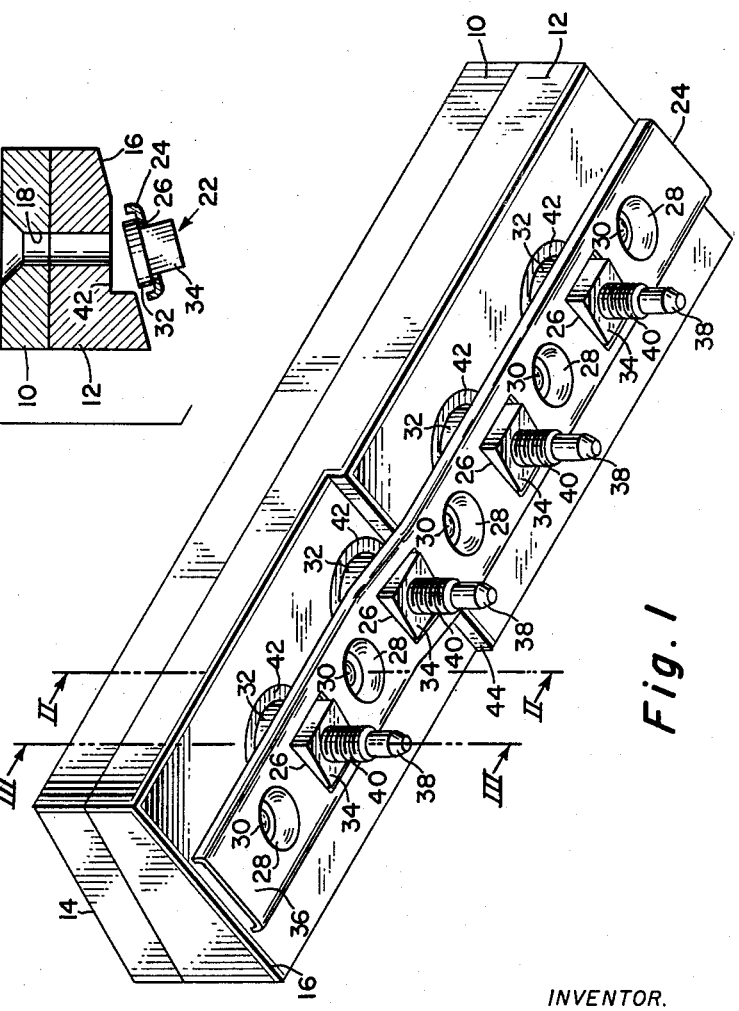
Fig. 1
INVENTOR.
SAMUEL K. HODGSON
ATTORNEYS

United States Patent Office 3,008,554
Patented Nov. 14, 1961

3,008,554
NUT AND RETAINER FOR WORKPIECES WITH NON-PARALLEL FACES
Samuel K. Hodgson, Dallas, Tex., assignor, by mesne assignments, to the United States of America as represented by the Secretary of the Navy
Filed Feb. 13, 1958, Ser. No. 715,156
1 Claim. (Cl. 189—36)

The present invention relates to fastening devices, and more particularly to the securing together of two or more structural members under conditions which render the inner end of the fastener itself inconvenient or impossible of access during the fastening operation.

In certain manufacturing processes, as for example in the aircraft industry, it is frequently necessary to fasten together two or more structural members one of which forms an enclosure, or is otherwise configured to prevent the operator from viewing and/or reaching the inner end of the fastener. Various expedients have been suggested for use in these situations, such for example as explosive rivets, or nuts which are permanently affixed to the exposed surface of the innermost member.

In each of the above examples, the exposed surfaces of the structural members to be joined are assumed to be essentially parallel. However, in certain instances this particular condition does not exist. For example, in the securing of a fuel tank to the wing structure of an aircraft, the former may be provided with an internal reinforcing beam the inner surface of which is not parallel with the plate or skin of the fuel tank, and hence not parallel to the surface of that element of the wing assembly by which the tank is to be supported.

In such circumstances, any nut which lies flat against the inner surface of the reinforcing beam (or is otherwise supported parallel to this surface) will not have its bore aligned with the opening in the structural members, assuming of course that such opening is normal to the outer, or exposed, working surface of the wing section from which the fastening operation is conducted. As a consequence, a conventional bolt inserted into this opening in the structural members will engage the threads of the "blind" nut at an angle, with a definite possibility that the nut threads will be stripped or broken when torque is applied to the bolt. Furthermore, any subsequent reprocessing of the nut frequently produces metallic chips or fragments which fall into the fuel tank where their presence may constitute a definite hazard to the safe operation of the aircraft.

In accordance with a feature of the present invention, means are provided to facilitate the alignment of a nut with a bolt when the former is supported by or from an inaccessible surface portion of one of a plurality of structural members to be fastened together, and which inaccessible surface portion is neither in parallel relationship with the outer, or working, surface of the structural assembly nor normal to the axis of the opening in the structural members through which a bolt is inserted for threadable engagement with the nut.

One object of the present invention, therefore, is to provide an improved form of a blind fastener particularly adapted for use when one surface of a plurality of members to be secured together is not in parallel alignment with the other oppositely-disposed surface of the assembly.

Another object of the invention is to provide a blind fastener for use when the bore of an inaccessible nut is angularly disposed to the axis of the opening in a plurality of structural members to be fastened prior to insertion of a bolt in such opening.

A further object of the invention is to provide a blind fastener assembly in which a nut, angularly disposed to the opening in a plurality of structural members prior to insertion of a bolt in such opening, is aligned with the latter by contact of the bolt with the nut before threadable engagement occurs therebetween.

Other objects and many of the attendant advantages of this invention will be readily appreciated as the same becomes better understood by reference to the following detailed description when considered in connection with the accompanying drawing wherein:

FIG. 1 is a fragmentary isometric view of a pair of structural members secured together by a plurality of blind fasteners designed in accordance with the principles of the present invention;

FIG. 2 is a cross-sectional view of FIG. 1 taken along line II—II;

FIG. 3 is a modified cross-sectional view of FIG. 1 taken along line III—III, illustrating one possible position of a nut prior to insertion of its associated bolt in the opening extending through the two structural members; and FIG. 4 shows the relative position assumed by the elements of FIG. 3 following a threadable engagement between the nut and bolt.

Referring now to the details of the drawing, two juxtaposed structural members to be secured together by the fastener of the present invention are identified by the reference numerals 10 and 12 respectively. The member 10 constitutes a structure the essentially flat outer surface 14 of which is accessible, while the member 12 comprises an inner element the surface 16 of which cannot be readily viewed and/or reached by an operator seeking to effect a secure fastening of the members. While only those portions of the structures 10 and 12 adjacent the fasteners have been illustrated in the drawing, it will be understood that the member 10 may constitute, for example, the plate or skin of a completely enclosed aircraft fuel tank, while the member 12 may be an internal reinforcing beam associated therewith. No ready method is available whereby the interior of such a fuel tank may be reached during the fastening operation except through the openings in which the fastening devices themselves are receivable.

As previously mentioned, the number of members to be fastened together is immaterial as far as the present invention is concerned, as only the outer surfaces 14 and 16 are of importance, and not the characteristics of the material or the number of laminations or discontinuities therebetween. Hence, the optical inclusion of a third structural member such for example as a portion of the aircraft wing assembly will not affect the following description.

As stated, the present invention is especially adapted for use when the two oppositely-disposed surfaces 14 and 16 are not in parallel relationship. In other words, an opening 18 extending through the members 10 and 12 so as to have its axis normal to the surface 14 will not be normal to the surface 16, as brought out by FIG. 3 especially. This opening 18 is configured and dimensioned to accommodate a threaded bolt, generally identified by the reference numeral 20. Although in FIG. 1 a plurality of fastening units are illustrated, each fastener is similar in operating principles, and hence the invention will be described mainly in connection with the single fastener shown in FIGS. 3 and 4.

Each bolt employed in the fastening operation is associated with a threaded nut 22. As is conventional in blind-fastener assemblies of the general nature being described, the nuts 22 are carried on a retainer 24 which may be a strip of some flexible material such as aluminum provided along its length with a series of nut-retaining openings 26 alternating with cup-shaped apertured depressions, or dimples, 28 projecting out of the plane of the retainer strip toward the surface 16. Hence, each opening 26 is disposed intermediate two of the depressions 28, and the aperture with which each depression 28 is provided permits the retainer strip 24 to be rigidly secured to the structural member 12 by means of a plurality of rivets 30 (see also FIG. 2). The retainer strip 24, with the nuts 22 being loosely carried in the openings 26 in a manner to be described below, is attached to the member 12 before the latter is placed in juxtaposition with member 10. Thus, the flush-mounted heads 31 of rivets 30 are not visible from the working surface 14, as brought out by FIG. 2.

Each nut 22 is specially formed with an annular upper (in the drawing) portion 32 and a square lower portion 34. The latter is receivable within its associated cutout portion, or opening, 26 in the retainer strip 24, as shown by FIG. 1. The opening 26 is larger than the dimensions of the square nut portion 34 in order to provide clearance between the nut and the sides of the opening and hence provide a limited amount of "floating" action or lateral movement of the nut relative to the retainer strip. Further, the nut 22 is of a conventional self-locking type, such as elastic, split, crimped, etc.

The upper, or annular, portion 32 of each nut 22 is larger in diameter than the opening 26, and lies between the retainer strip 24 and the surface 16 of member 12. Thus, when an outer corner of the square portion 34 of each nut 22 is staked, the latter is loosely retained within its associated opening 26, and is prevented from being dislodged from such opening during or after the process by which the strip 24 is riveted to the structural member 12.

It will be noted that the securing of retainer strip 24 to member 12 causes the former to assume a position in which its main surface area 36 (FIG. 1) is essentially parallel to the surface 16. This is particularly apparent in FIG. 3. Consequently, if the nuts 22 are in such an environment that their annular portions 32 rest upon the retainer strip 24, the relative position of these elements will be as shown in FIG. 3 prior to insertion of bolt 20 in opening 18. In other words, the bore or axis of the threaded opening in nut 22 will not coincide with the axis of opening 18, but instead will be disposed thereto at an angle other than zero. It will also be appreciated that the same effect will be produced upon initial contact between bolt 20 and nut 22 in cases where the rounded portion 32 of the latter may not be resting directly upon strip 24 (such as when the axis of opening 18 is essentially horizontal) as even the slightest inward pressure upon the loosely-held nut will force it against retainer strip 24 and hence cause it to assume the position of FIG. 3.

With the nut 22 in the position of FIG. 3, it will be apparent that insertion of a conventional bolt in opening 18 may or may not produce a correct threadable engagement with the nut, depending both upon the magnitude of the angle formed by the bore of the nut and the axis of the opening, and upon the relationship between the respective thread terminations. In other words, for conventional bolts to be uniformly successful in engaging the nuts 22, the latter must be linearly aligned with the openings in the structural members to be joined.

In accordance with a principal feature of the present invention, each bolt 20 is designed to perform an aligning operation upon contact with its associated nut. This is achieved by fabricating each bolt with a pilot prong 38 which extends beyond the outer termination of the bolt threads 40. This pilot prong 38 is of a generally tapered configuration, with the amount of taper being determined largely by the angle formed by the bore of the nut 22 and the axis of the opening 18. In many cases the degree of taper may be substantially as illustrated in the drawing. Since this prong 38 contacts the threaded inner surface of nut 22 before the threads 40 do so, the nut 22 is caused to assume a position (such as shown in FIG. 4) in which the nut is aligned with the bolt 20 before the threads of the bolt engage the threads of the nut. Any possibility of misengagement or stripped threads is thus precluded, since thread registry is inherently established before actual engagement.

It is desirable that the upper (in the drawing) surface of each rounded nut portion 32 be in essentially face-to-face contact with the surface 16. Accordingly, those portions of surface 16 which surround the openings 18 are spot-faced at 42 (see especially FIG. 1) prior to attachment of the retainer strip 24 to provide flat surface areas which are parallel to the outer surface 14 and hence normal to the axis of the openings 18. Surface-to-surface contact between the nuts 22 and the structural member 12 is thus established to more securely fasten the latter to its juxtaposed member 10. As in previously-known retainers, the nuts 22 are prevented from rotating as the bolts 20 are turned due to their confinement within the cutout areas 26, and hence the nuts can be drawn up tightly against the spot-faced surfaces 42.

It is not necessary that the inner surface 16 of member 12 be flat or even. Many irregularities and surface discontinuities can be overcome by the self-aligning blind fasteners of the present invention, such for example, as those caused by a shoulder 44 which effectively divides the surface 16 into two portions lying in different and intersecting planes. Even though this results in a rather sharp bend in the surface 36 of the retainer strip 24, the freedom of movement which each nut 22 possesses permits the nut portions 34 to "float" within their respective cutout areas 26 to the degree necessary to permit the pilot prong 38 of each bolt 20 to effect a proper engagement of the nut and bolt threads and hence a secure fastening together of the structural members of the assembly.

Obviously many modifications and variations of the present invention are possible in the light of the above teachings. It is therefore to be understood that within the scope of the appended claim the invention may be practiced otherwise than as specifically described.

I claim:

In combination, at least two juxtaposed structural members, said members having a planar outer surface which is exposed and a planar inner surface which is relatively inaccessible, said members also having a surface-to-surface opening the axis of which is normal to the said exposed planar outer surface but other than perpendicular to the said inaccessible planar inner surface thereof, that portion of the said inaccessible planar inner surface which surrounds said opening being recessed so as to define a plane which is essentially parallel to the exposed outer surface of said members, a threaded flanged nut having a body portion which is elongated in an axial direction, a retainer strip having a nut-receiving cut-out portion the dimensions of which exceed the outer dimensions of the body portion of said nut and which cut-out portion lies in spaced-apart relation from the inner surface of said structural members, said retainer strip generally defining a plane which is parallel to the plane defined by the inner surface of said structural members but other than parallel to the plane defined by the outer surface of said members, the body portion of said nut being positioned in the cut-out portion of said retainer strip and being freely supported by the flange thereof adjacent the opening in said structural members so that the body portion of said nut has a limited amount of lateral movement with respect to the axis of said opening as well as longitudinally thereof, the body portion of said nut and the nut-receiving cut-out portion of said retainer strip having complementary non-circular configurations to preclude any appreciable rotation of said nut, the bore of said nut normally defining an angle other than zero with the axis of said opening and lying normal to the plane of said retainer strip prior to the securing together of said structural members, a plurality of cup-shaped depressions in said retainer strip projecting toward the inner surface of said structural members and with the base portion of each such cup-shaped depression lying in parallel relationship to the surface of the retainer strip, each of said cup-shaped depressions having an opening therein, and means associated with such cup-shaped depressions and adapted to pass through the respective openings therein for securing said strip to the inner surface of said structural members so that the plane of said strip will be other than parallel with the plane defined by that portion of the inner surface of said structural members which surrounds the said opening, and a threaded bolt adapted to be inserted in said opening for threadable engagement with said nut, said bolt having a tapered end portion spaced from the threaded portion thereof, whereby, upon contact of the tapered end portion of said bolt with said nut, said tapered end portion will act to reduce substantially to zero the angular relationship between the bore of said nut and the axis of said opening prior to engagement between the threads of said nut and the threads of said bolt, and, upon continued engagement between the threads of said nut and the threads of said bolt, the flange of said nut will be drawn into the recessed portion of the inner surface of said structural members which surrounds said opening while the body portion of said nut remains within the cut-out portion of said retainer strip due to the elongated configuration thereof, such that said nut is caused to lie within its bore forming an angle other than 90° both to the plane defined by the inner surface of said structural members and to the plane generally defined by said retainer strip.

References Cited in the file of this patent

UNITED STATES PATENTS

| | | |
|---|---|---|
| 588,338 | Ka Vear | Aug. 17, 1897 |
| 620,812 | Ward | Mar. 7, 1899 |
| 1,503,408 | Williams | July 29, 1924 |
| 2,421,201 | Hallock | May 27, 1947 |
| 2,429,833 | Luce | Oct. 28, 1947 |
| 2,633,175 | Desbrueres | Mar. 31, 1953 |
| 2,688,167 | Wilson | Sept. 7, 1954 |